Nov. 14, 1967    H. H. ANDERSON    3,352,444
SELF-TIGHTENING PRESSURE VESSEL CLOSURE
Filed Dec. 28, 1965    3 Sheets-Sheet 1

Inventor
HAROLD HENRY ANDERSON
By Mason, Fenwick & Lawrence
Attorneys

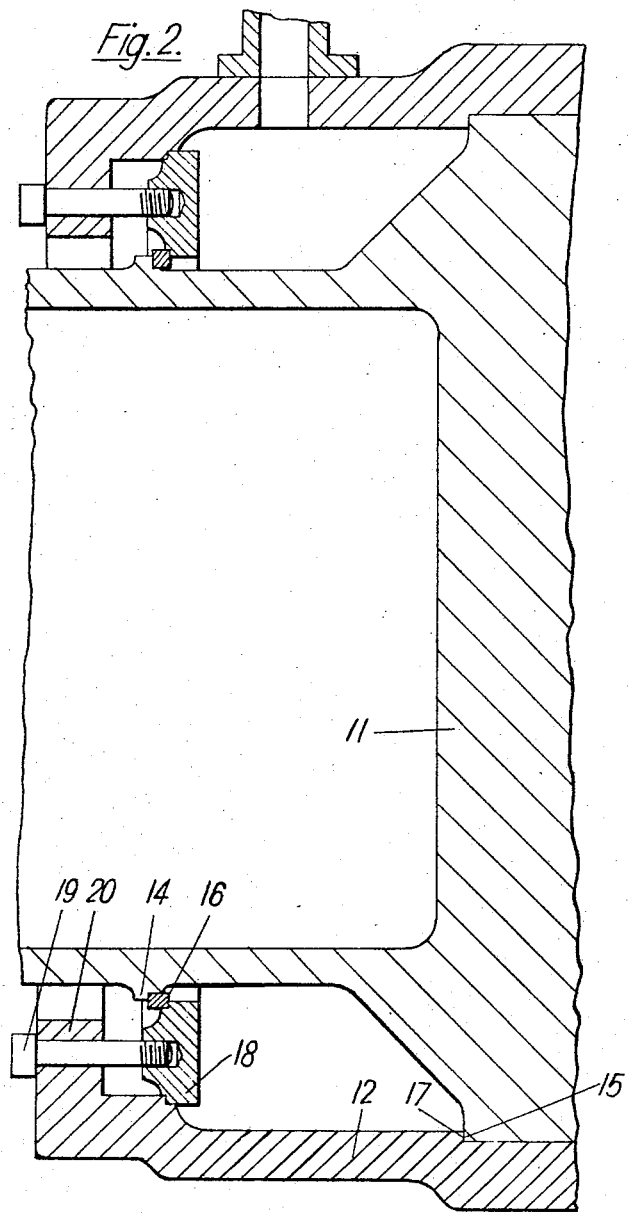

Nov. 14, 1967 H. H. ANDERSON 3,352,444
SELF-TIGHTENING PRESSURE VESSEL CLOSURE
Filed Dec. 28, 1965 3 Sheets-Sheet 3

Inventor
HAROLD HENRY ANDERSON
By Mason, Fenwick & Lawrence
Attorneys

United States Patent Office 3,352,444
Patented Nov. 14, 1967

3,352,444
SELF-TIGHTENING PRESSURE VESSEL CLOSURE
Harold Henry Anderson, Glasgow, Scotland, assignor to G. & J. Weir Limited
Filed Dec. 28, 1965, Ser. No. 516,971
Claims priority, application Great Britain, Dec. 30, 1964, 52,757/64
19 Claims. (Cl. 220—14)

ABSTRACT OF THE DISCLOSURE

The present invention concerns a seal for sealing an annular space between two members held rigidly relative to each other, the sealing including an annular closure plate intended to abut one of said members and an endless metal sealing ring interposed between said closure member and a protrusion outstanding from the other of said members, such that any force within the vessel tends to force the member into closer sealing engagement with the ring and the said one member.

---

This invention relates to improvements in seals for use in sealing an annular clearance between a first member and a second member passing therethrough.

According to the present invention there is provided a seal for use in sealing an annular clearance between a first member and a second member passing therethrough, means being provided to hold said second member against withdrawal or expulsion from the first member when said seal is in use, said seal including an annular protrusion outstanding from the periphery of the second member, a seal ring intended to abut one side of the protrusion, and a closure plate intended to abut directly or indirectly the seal ring and the first member such that any force exerted in a direction to withdraw or expel the second member from the first member forces the closure plate towards the protrusion to cause closer sealing between the plate, the ring and the protrusion.

Preferably the seal ring is a resilient deformable metal ring which is temporarily deformed from circular to oval shape for fitment or removal over the annular protrusion, the ring being returned to, or substantially to, its circular shape thereafter.

The seal ring may be an oval resilient deformable metal ring which is temporarily deformed to increase its original ovality for fitment or removal over the annular protrusion, said originally oval ring being deformed to a substantially circular shape after fitment.

Any or all of the deformations may involve deforming the ring beyond the elastic limit of the material of the ring.

Preferably the closure plate is held in position by a series of bolts fixed relative to the first member and engaging with said plate, said bolts being arranged such that tightening of the bolts draws the closure plate into closer direct or indirect engagement with the seal ring and the first member.

Preferably the inside diameter of the closure plate is slightly greater than the outside diameter of the protrusion.

A clamping ring may be provided, said ring being held against movement in a direction towards the closure plate and being provided with a plurality of bolts adapted to engage the closure plate to hold said plate against the seal ring.

Preferably the first member comprises a wall of a pressure vessel or chamber, and the second member is a tubular member.

Preferably the first and second members are concentric tubular members.

The means for holding the tubular member may include a second annular protrusion outstanding from the periphery of the tubular member and abutting an intermediate wall within the pressure chamber, such that said intermediate wall holds the tubular member against pressure within the chamber, said intermediate wall being fixed in position relative to the wall of the pressure vessel.

A second seal ring may be interposed between the intermediate wall and the tubular member.

Preferably the second seal ring is a resilient deformable metal ring which is temporarily deformed from circular to oval shape for fitment between or removal from between the intermediate wall and the tubular member, the ring being returned to, or substantially to, its circular shape thereafter.

The second seal ring may be an oval resilient deformable metal ring which is temporarily deformed to increase its original ovality for fitment between or removal from between the intermediate wall and the tubular member, said originally oval ring being deformed to a substantially circular shape after fitment.

Any or all of the deformations may involve deforming the second seal ring beyond the elastic limit of the material of the ring.

The means for holding the tubular member may include a second annular protrusion outstanding from the periphery of the tubular member and abutting a recess in the wall of pressure chamber, such that said recess holds the tubular member against pressure within the chamber.

The means for holding the tubular member may include another seal ring housed in a recess in the wall of the pressure chamber and protruding into the bore of the chamber, said ring communicating with the tubular member.

Preferably said other seal ring is a resilient deformable metal ring which is temporarily deformed from circular to oval shape for fitment into or removal from said recess, the ring being returned to, or substantially to, its circular shape thereafter.

The other seal ring may be an oval resilient deformable metal ring which is temporarily deformed to increase its original ovality for fitment into or removal from said recess, said originally oval ring being deformed to a substantially circular shape after fitment.

Any or all of the deformations may involve deforming the other seal ring beyond the elastic limit of the material of the ring.

Preferably the closure plate abuts both seal rings, extends into the pressure chamber and is adapted to abut the tubular member.

Preferably the closure plate and the tubular member are provided with circumferential interfitting segmental slots and projections.

Preferably the closure plate is resilient.

Embodiments of the present invention will now be described by way of example with reference to the accompanying drawings of which, FIG. 1 shows one embodiment of the present invention.

FIG. 2 shows another embodiment of the present invention, and

Our co-pending application No. 453,150 covers one form of closure device, the present application covers another form of closure device for closing an annular opening, for example, the opening between a duct and the wall of a pressure vessel through which the duct passes.

Figure 1:
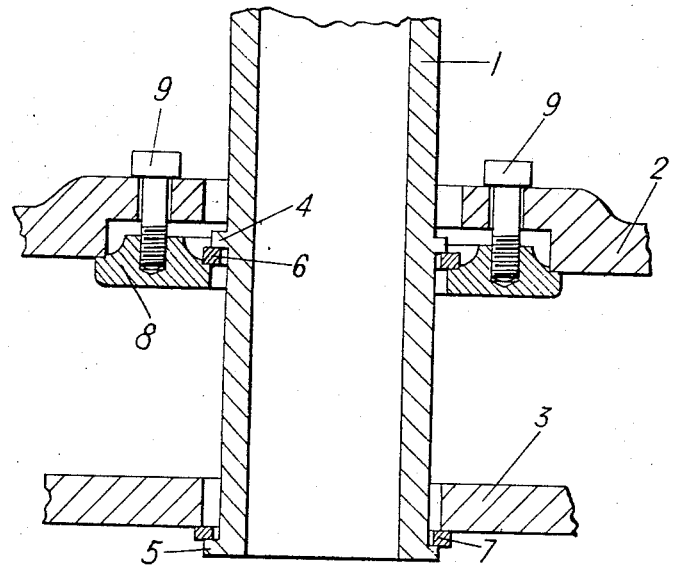

In the embodiment illustrated in FIG. 1, a duct 1 passes through both the outside wall 2 and intermediate wall 3 of a pressure vessel.

The duct 1 is provided with a first annular protrusion 4 outstanding from its periphery, spaced a predetermined distance from the end of the pipe within the pressure vessel, and a second similar protrusion, or flange 5, at said duct end.

Two endless annular sealing rings 6, 7 are provided around the duct between said protrusion 4 and said flange 5, one ring 6 intended to abut that side of the protrusion 4 within the pressure vessel, the other 7 intended to abut the flange 5. The internal diameter of the rings 6 and 7 is slightly greater than the outside diameter of the duct 1 but less than the outside diameter of the protrusions 4 and 5, and the external diameter of the rings 6 and 7 is greater than the outside diameter of the protrusions 4 and 5.

An annular closure plate 8 whose inside diameter is greater than the outside diameter of the protrusions but less than the external diameter of the rings is intended to abut the inside of the wall 2 of the pressure vessel and to sandwich the sealing ring 6 between said plate and said first protrusion 4. The closure plate 8 is provided with a series of bolts 9 engaging in said plate and passing through the wall 2 of the pressure vessel such that by tightening the bolts the closure plate is held in position against the wall of the pressure vessel and against the seal ring 6.

The intermediate wall 3 of the pressure vessel is fixed relative to the outside wall 2 of the pressure vessel and is provided with an opening for the duct, the diameter of which opening is less than the external diameter of the sealing ring 7.

To assemble the duct 1 within the pressure vessel the annular closure plate 8 is positioned in the vessel with its fixing bolts 9 slack. The first sealing ring 6 is then fitted around the duct 1 between the protrusions 4 and 5 by applying a force to the ring to distort it out of its circular shape into an oval shape, said force being sufficient to distort the ring but not great enough to exceed the elastic limit of the material of the ring, maneuvering the ring over the flange 5 and removing the distorting force to return the ring to, or substantially to, its original circular shape.

The flanged end of the duct is then inserted into the pressure vessel, and on account of the difference in inside diameter of the closure plate 8 and external diameter of the sealing ring 6, the duct will be prevented from being inserted further into the pressure vessel when the sealing ring abuts the closure plate on one side, and the annular protrusion on the other side. At this point the flanged end of the duct will have passed sufficiently through the intermediate wall 3 to enable the second sealing ring 7, suitably distorted, to be maneuvered over the flange 5.

The bolts 9 can then be tightened, resulting in the duct 1 being drawn out of the vessel until the second sealing ring 7 is sandwiched between the intermediate wall 3 and the flange 5, further movement of the duct 1 is then impossible and continued tightening of the bolts 9 will increase the sealing force.

As the closure plate 8 is manufactured from some resilient material tightening the bolts 9 will cause the plate to be slightly coned.

In operation pressure within the vessel forces the closure plate 8 into closer engagement with the seal ring 6 thus improving the seal.

In another embodiment of the present invention as shown in FIG. 2, a circular member 11 extends through the end of a pressure vessel 12. The member 11 is provided with a first annular protrusion 14 and a second annular protrusion 15 outstanding from its periphery and a seal ring 16 intended to abut the side of said first protrusion 14 within the pressure vessel 12.

An annular closure plate 18 is provided also and is equipped with bolts 19 engaging in the closure plate and passing through an inturned flange 20 formed on the end of the pressure vessel 12.

The bore of the pressure vessel is provided with a step 17 against which the second protrusion 15 from the member is intended to abut.

To assemble this embodiment, firstly the closure plate 18 then the seal ring 16 in its deformed state are fitted around the member 11. The seal ring 16 is then returned to its undeformed state and the member is inserted from the inside end of the pressure vessel and moved towards the flanged end 20 of the pressure vessel until the second protrusion 15 abuts the step 17 in the bore of the pressure vessel.

The tightening bolts 19 can then be passed through the flange 20 of the pressure vessel to engage in the closure plate 18, the bolts can be tightened and the embodiment will function in a similar manner to that described for the previous embodiment.

Figure 2A:
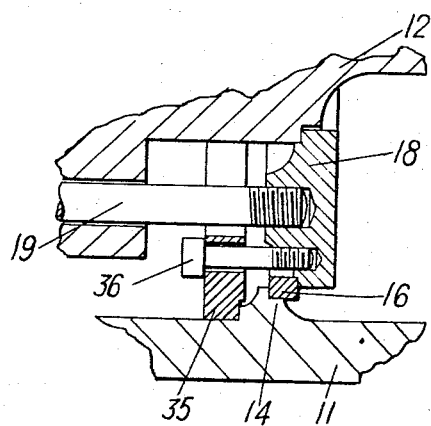
FIG. 2a shows a detailed view of a part of the embodiment shown in FIG. 2 and incorporates a modification.

FIG. 2a shows a clamping ring 35 abutting the side of the protrusion 14 remote from the seal ring 16 and carrying clamping bolts 36 threaded in the annular closure plate 18.

In assembly of this modification the ring 16 and plate 18 are positioned as above the bolts 36 are then inserted in plate 18 and are tightened to hold the plate in position against the ring. In this way the seal is clamped in position immediately after assembly and no dirt can penetrate into the seal and thus reduce its efficiency. Further, the plate 18 is positioned positively relatively to the bolts 19 passing through the flange 20 and it is not necessary to adjust the position of plate 18 within the chamber for insertion of the bolts, this positioning normally being difficult due to the limited access to the interior of the chamber.

Figure 3:
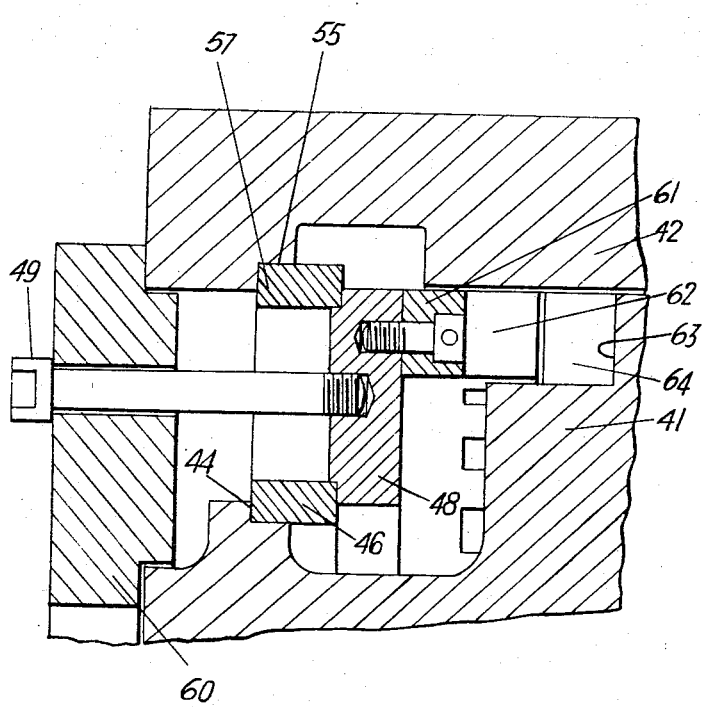
FIG. 3 is a detailed drawing of a modification of the embodiment shown in FIG. 2.

A modification of the embodiment illustrated in FIG. 2 is shown in detail in FIG. 3, the same reference numerals being used for parts common to the embodiment and the modification.

The modification makes possible the sealing of the end of a pressure vessel where movement of the tubular member or plate, for example end plate, 41 within the pressure vessel 42 is impossible or difficult.

The member 41 is provided, around its periphery, with several equidistant segmental slots 63, having between them segmental projections 64. An endless annular ring 61 is rigidly attached to the closure plate 48 and extends into the pressure chamber. This ring 61 is also provided with equidistant segmental projections 62, which are similar to projections 64, and to permit the ring 61 to move further within the pressure chamber the projections 62 are housed in the slots 63, movement of the closure plate 48 into the vessel then being possible.

To assemble the seal the closure plate 48 is turned such that the projections 62 are aligned with the slots 63, and the ring is pushed into the pressure vessel 42. Sealing rings 46 and 57 can then be inserted into pressure vessel in their deformed state over the protrusion 44 and into the recess 55 in the wall of the vessel 12, respectively. The closure plate 48 can then be withdrawn to seat against the sealing rings 46 and 57, now in their undeformed state, and can be rotated such that the projections 62 on the extension from the closure plate 48 and the projections 64 are aligned, any movement of the member 41 out of the vessel being prevented due to the abutment of the projections 64 and 62 and the abutment of the ring 48 with the seal ring 57.

The closure plate 48 is held in position against the rings 46 and 57 when there is no pressure within the vessel by a plurality of bolts 19 passing through an end plate 60 which abuts the end of the vessel 42.

In the abovedescribed embodiments the cross-section of the sealing rings is shown as being rectangular, rings of any other suitable cross-section, however, can be used.

In the embodiments described above the sealing rings are circular in their unstressed condition, it is possible however, to use oval sealing rings. In this case the minor axis of the approximately elliptical ring preferably lies half way between the original outer diameter of the protrusion and the bore of the admittance aperture. This oval ring is in a completely unstressed state. It many then be deformed further, that is, its original minor axis diminished within the elastic limit of the material of which it is made, its minor axis to be less than the diameter of the access aperture to the pressure vessel. When released within the bore of the pressure vessel it will resume its original generally oval shape and will then be distorted into an approximately round shape by extending its minor axis by means of a suitable tool. It can then be pulled into position within the vessel to form a circular abutment against which the previously inserted closure plate may seal. In this manner, a ring of greater radial thickness than previously can be used without subjecting it to greater distorting stresses than the yield point of the material of which it is made. Hence the intensity of compressive stress between the sealing ring and the closure plate and the sealing ring and the abutment within the pressure vessel can be reduced for a given applied hydraulic load acting on a closure plate, since the radially thicker ring allows increased area of contact between itself and the step in the bore of the vessel and/or between itself and the closure plate.

All the seal rings described above have been distorted within their elastic limit for fitment into their respective positions. The rings will function equally well, however, if they are distorted beyond their elastic limit for insertion, and thereafter deformed to a substantially circular shape.

To dismantle the seals of any of the embodiments described above the procedure followed is the reverse of that described for assembling the seals.

The seal described above is also applicable to purely mechanical duties where it is required to hold thrust only and not pressure.

I claim:

1. A seal for use in sealing an annular space defined by first and second members held rigidly relative to each other, said seal including an annular protrusion outstanding from the periphery of one of said members, an endless metal seal ring abutting one side of the protrusion and an annular closure plate abutting against the seal ring and the other of said members, said ring having parallel bearing faces, said faces being perpendicular to the direction of any force acting on the plate tending to open the space, to ensure that any force within the space trying to open the space forces the plate into closer engagement with the ring.

2. A seal as claimed in claim 1, in which the closure plate is held in position by a series of bolts fixed relative to the first member and engaging with said plate, said bolts being arranged such that tightening of the bolts draw the closure plate into closer direct or indirect engagement with the seal ring and the first member.

3. A seal as claimed in claim 1, in which the inside diameter of the closure plate is slightly greater than the outside diameter of the protrusion.

4. A seal as claimed in claim 1, in which a clamping ring is provided, said ring being held against movement in a direction towards the closure plate and being provided with a plurality of bolts adapted to engage the closure plate to hold said plate against the seal ring.

5. A seal as claimed in claim 1, in which the first member comprises a wall of a pressure vessel or chamber, and the second member is a tubular member.

6. A seal as claimed in claim 1, in which the first and second members are concentric tubular members.

7. A seal as claimed in claim 6, in which the means for holding the tubular member includes a second annular protrusion outstanding from the periphery of the tubular member and abutting an intermediate wall within the pressure chamber, such that said intermediate wall holds the tubular member against pressure within the chamber, said intermediate wall being fixed in position relative to the wall of the pressure vessel.

8. A seal as claimed in claim 7, in which a second seal ring is interposed between the intermediate wall and the tubular member.

9. A seal as claimed in claim 8, in which the second seal ring is a resilient deformable metal ring which is temporarily deformed from circular to oval shape for fitment between, or removal from between, the intermediate wall and the tubular member, the ring being returned to, or substantially to, its circular shape thereafter.

10. A seal as claimed in claim 8, in which the second seal ring is an oval resilient deformable metal ring which is temporarily deformed to increase its original ovality for fitment between, or removal from between, the intermediate wall and the tubular member, said originally oval ring being deformed to a substantially circular shape after fitment.

11. A seal as claimed in claim 9, in which any or all of the deformations involve deforming the second seal ring beyond the elastic limit of the material of the ring.

12. A seal as claimed in claim 9, in which the means for holding the tubular second member includes a second annular protrusion outstanding from the periphery of the tubular second member and abutting a recess in the wall of the first member so that said recess holds the tubular second members against pressure within the chamber.

13. A seal as claimed in claim 5, in which the means for holding the tubular second member includes another seal ring housed in a recess in the wall of the pressure chamber and protruding into the bore of the chamber, said ring communicating with the tubular second member.

14. A seal as claimed in claim 13, in which said other seal ring is a resilient deformable metal ring which is temporarily deformed from circular to oval shape for fitment into or removal from said recess, the ring being returned to, or substantially to, its circular shape thereafter.

15. A seal as claimed in claim 13, in which said other seal ring is an oval resilient deformable metal ring which is temporarily deformed to increased its original ovality for fitment into or removal from said recess.

16. A seal as claimed in claim 14, in which any or all of the deformations involve deforming the other seal ring beyond the elastic limit of the material of the ring.

17. A seal as claimed in claim 13, in which the closure plate abuts both seal rings, extends into the pressure chamber and is adapted to abut the tubular second member.

18. A seal as claimed in claim 13, in which the closure plate and the tubular second member or plate, for example end plate, are provided with circumferential interfitting segmental slots and projections.

19. A seal as claimed in claim 1, in which the closure plate is resilient.

References Cited
UNITED STATES PATENTS

| | | | |
|---|---|---|---|
| 2,256,488 | 8/1941 | Bierand | 220—46 |
| 2,582,995 | 1/1952 | Laurent | 220—46 |
| 2,617,554 | 11/1952 | Smith | 220—55 |

FOREIGN PATENTS

| | | |
|---|---|---|
| 726,709 | 3/1955 | Great Britain. |

RAPHAEL H. SCHWARTZ, *Primary Examiner.*